United States Patent [19]

Fujita

[11] Patent Number: 5,222,086
[45] Date of Patent: Jun. 22, 1993

[54] METHOD FOR THE LINKING OF DATA DURING THE RECORDING OF ENCODED DATA ON A RECORDABLE TYPE OPTICAL DISK

[75] Inventor: Mutsumi Fujita, Illkirch, France

[73] Assignee: Laboratoire Europeen de Recherches Electroniques Avancees Societe en nom Collectif, Courbevoie, France

[21] Appl. No.: 622,824

[22] Filed: Dec. 5, 1990

[30] Foreign Application Priority Data

Dec. 29, 1989 [FR] France ................. 89 17433

[51] Int. Cl.$^5$ ............................................. G06F 11/10
[52] U.S. Cl. .................. 371/37.5; 371/38.1; 371/39.1
[58] Field of Search .............. 371/37.5, 37.4, 38.1, 371/39.1, 37.1, 40.1; 360/53

[56] References Cited

U.S. PATENT DOCUMENTS

| | | | |
|---|---|---|---|
| 4,598,403 | 7/1986 | Odaka | 371/37.5 |
| 4,796,110 | 1/1989 | Glass et al. | 371/37.5 |
| 4,964,128 | 10/1990 | Sako et al. | 371/37.5 |
| 5,077,736 | 12/1991 | Dunphy, Jr. et al. | 371/40.1 |

FOREIGN PATENT DOCUMENTS 144813  6/1985  European Pat. Off. .
286412 10/1988  European Pat. Off. .
310089  4/1989  European Pat. Off. .
342833 11/1989  European Pat. Off. .

*Primary Examiner*—Robert W. Beausoliel, Jr.
*Assistant Examiner*—Phung My Chung
*Attorney, Agent, or Firm*—Roland Plottel

[57] ABSTRACT

A method for linking data for recording on a recordable type of optical disk with data encoded according to a specific encoding using a CIRC type error correction system. The pieces of data are organized in frames, in blocks of p frames and in groups of n blocks. The frames of data and frames of sub-codes are synchronized by using pieces of information pre-recorded on the disk. During encoding, each group of n blocks receives and is preceded by three redundant blocks, namely a run-in block (RIN) itself preceded by a first dummy block (DMI) and second dummy block (DM2); and is follwed by two redundant blocks, namely a run-out block (ROUT) which is followed by a third dummy block (DM3). During writing on the disk, the length of the three redundant blocks is sufficient. They effectively set-up the record and reading of the data and its interleaving and error correction code. The disclosed method can be applied particularly to recordable optical compact disks.

10 Claims, 1 Drawing Sheet

METHOD FOR THE LINKING OF DATA DURING THE RECORDING OF ENCODED DATA ON A RECORDABLE TYPE OPTICAL DISK

BACKGROUND OF THE INVENTION

1. Field of the Invention

The invention relates generally to methods for linking data during recording encoded data on a recordable type optical disk, and more particularly to using an error correction code of the Cross Interleave Reed-Solomon Code (CIRC) type.

2. Description of the prior Art

In optical disks, and particularly in compact disks, namely audio compact disks (CD-audio) or read-only memory CDs (CD-ROM), the pieces of data that are to be recorded on the disk are encoded by using a specific modulation code, notably the EFM (Eight to Fourteen Modulation) code, well known to those skilled in the art. Furthermore, to correct the errors that occur on a disk, an error correction code which, in this case, is the CIRC, is associated with the EFM code. This error correction code enables the correction of most of the errors that occur on the disk, by carrying out an interleaving of the data. Owing to the use of these different codes, as well as the addition of parity or control bits, the data originally having a certain number of bits, is recorded on the disk with larger number of bits. Furthermore, due to the nature of interleaving along the position of the last few bits is not know with precision, because these bits are not recorded sequentially.

According to present compact disk standards, to enable easy synchronization of the pieces of data recorded on the disk, they are divided into frames which are grouped in blocks of p frames. In the ROM-CD or audio-CD standard, each frame is formed by 24 bytes and one byte of sub-codes, and each block is formed by 98 frames or 2352 bytes. All the sub-codes of the 98 frames constitute a frame of sub-codes. The interleaving due to the error correction code uses 108 frames at the most. The interleaving does not raise any problems in the case of a CD-ROM format or CD-audio format, because the data is recorded only once. This recording is done by the manufacturer A problem of linking data arises when it is desired to use the same type of error correction code on a rewritable type of optical disk or a "Write Once" disk, where data is to be written at least once by a user. But, the interleaving for the error correction code does not facilitate the linking of the data. It is necessary to have a relatively large number of redundant blocks so as to be sure of recording all the data on this disk. This also increases the access time.

It is an object of the present invention, therefore, to provide a data-linking method during recording, on a recordable type of optical disk, of data encoded according to a specific coding using a CIRC error correction system which makes it possible to limit the number of redundant blocks necessary for the recording of each group of data.

SUMMARY OF THE INVENTION

An aspect of the present invention is a method for linking data during recording, on a recordable type the optical disk, of being encoded scheme and according to a specific encoding using a CIRC type error correction system in which pieces of data are organized in frames, in blocks of p frames and in groups of n blocks. The frames of and the blocks are synchronized by using pieces of information pre-recorded on the disk; and wherein, during encoding, each group of n blocks is preceded by three redundant blocks, namely one run-in block itself preceded by a first dummy block, and a second dummy block, and is followed by two redundant blocks, namely a run-out block which is followed by a third dummy block; and, during writing on the disk, the length of three redundant blocks is sufficient for synchronization and recording the error correction.

Thus, with this scheme, a smaller number of blocks than the number of blocks necessary during the encoding is written on this disk. This leads to lower redundancy and provides for smaller groups of n blocks, thus improving the access time.

According to another characteristic of the present invention, writing on the disk is initialized by a link position determined by a piece of information on sub-coding synchronization, itself synchronized with the pre-recorded synchronization information. Preferably, this link position is obtained to within plus or minus two encoded frames.

According to a particular embodiment, the link position is computed so that it is found at a position ranging from 11 to 98 frames encoded after the start of the sub-coding synchronization information, preferably at 55 encoded frames from the synchronization information. This computation for the link position arises because the maximum interleaving is one of 108 frames. This means that the data may extend over 10 frames of the following block (108−98=10) when there is the maximum interleaving. The link position should be between the next frame (11th) and the last (98th) frame of the block. Furthermore, the preferred position given by the 55th frame corresponds to the middle position. This middle position is the best position to obtain a maximum tolerance for the synchronization. This determination of he link position makes it possible, in particular, to get by with only three blocks.

According to another characteristic of the present invention, the writing period starts in the sub-coding frame corresponding to the second dummy block, and stops in the sub-coding frame corresponding to the third dummy block.

BRIEF DESCRIPTION OF THE DRAWINGS

Other characteristics and advantages of the present invention will appear from the following detailed description of a preferred embodiment, made with reference to the appended drawing, wherein.

DESCRIPTION OF A PREFERRED EMBODIMENT

Figure 1:
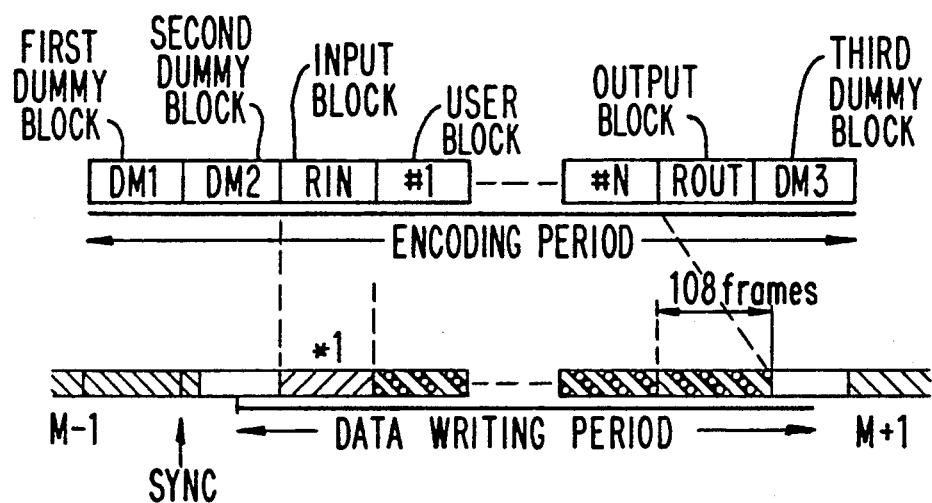
FIG. 1 is a schematic drawing explaining the data-linking method according to the present invention.

The drawing of FIG. 1 is based on the use of an ideal CIRC/EFM encoder which contributes no delay except the delay due to the CIRC type error correction code. As shown by the part referenced "encoding period", the output coming from the encoder is therefore formed by the following blocks, namely a first dummy block referenced DM1, a second dummy block referenced DM2, a run-in block referenced RIN, N user blocks referenced 1 . . . N, a run-out block referenced ROUT and a third dummy block referenced DM3.

The pieces of data in the different blocks have been encoded according to the ROM-CD standard. Each block therefore includes at least pieces of information on synchronization, a preamble including at least pieces of information on the mode used and pieces of information on the block, the preamble being followed by at least one data field. Depending on the type of mode used, the block format will include other pieces of information such as the parity bits or a sub-preamble.

Within the framework of the present invention, the two dummy blocks DM1 and DM2 are used solely to fill the start of the flow of EFM data. In this case, the data field of these blocks may contain every type of data except the data having the same pattern as the block synchronization information.

The run-in block RIN is used to set up a protection of the synchronization block. More particularly, the pieces of information on block synchronization of the run-in block RIN are used, during the reading, to obtain the synchronization of the first user data block. Thus, when either the pieces of information o the synchronization of the run-in block RIN or the pieces of information on the synchronization of the first data block are lacking owing to a fault in the disk or to a reading error, the synchronization may nevertheless be achieved at the start of the first data block. The data field recorded in the run-in block RIN may contain every type of data with the exception of data having the same pattern as the block synchronization information. The redundant block, called a run-out block ROUT, is used for the interleaving of the last part of the data blocks. The block synchronization information and preamble synchronization information should be valid. The data field of the run-out block ROUT may contain every type of data except for data having the same pattern as the block synchronization information. In the same way, the third dummy block is used because of the interleaving of the last data block and to enable to CIRC/EFM decoder to process the last part of the data.

Figure 2:
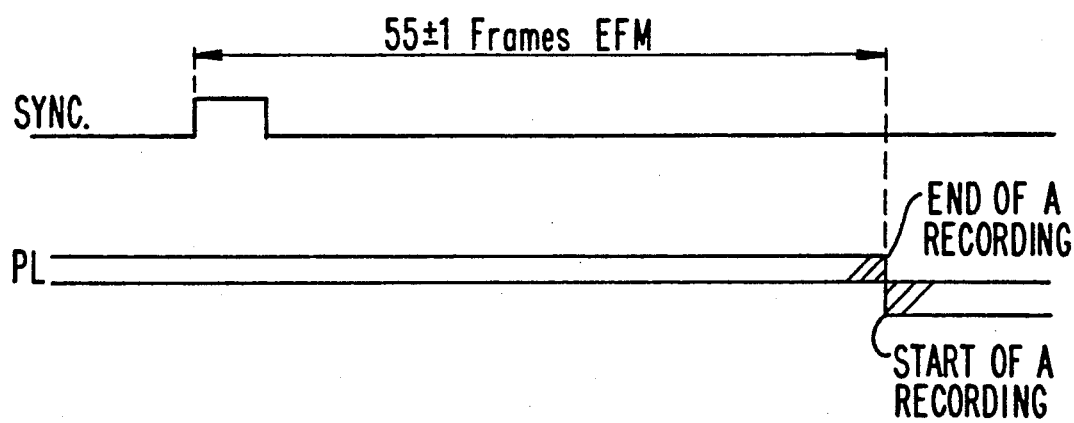
FIG. 2 is a graph explaining the linking rule.

Furthermore, according to the present invention, we have chosen the link position referenced PL in FIG. 2 in such a way that this position is between 11 and 98 EFM frames or frames encoded after the information on sub-coding synchronization in FIG. 2. The link position, as shown in FIG. 2, is the physical place on the disk where the recording of the encoded signals may start and stop. The link position chosen within the framework of the present invention is at 55±1 encoded frames or EFM frames after the start of the sub-coding synchronization information SYNC, as shown in FIG. 2. Consequently, an overwriting, or an interval of at most two EFM frames may occur.

By using the above-mentioned linking rules, it is seen that the data-writing period may start during the period of the second dummy block DM2 as symbolized by the reference D in FIG. 1. D is located at 55+1 EFM frames after the detection of the start of the sub-coding synchronization information SYNC. The information SYNC has been detected at most one frame before the end of the writing of the M-1th group in the embodiment shown.

Then, the recording of the data which includes the recording of the block RIN and of the user data blocks 1 to N continues up to about 55 encoded frames after the detection of the block synchronization information of the third dummy block DM3 as shown in FIG. 1. In using the above-described method, it is seen that the writing starts at one block plus (98−55) EFM frames before the first block of the data and ends at one block plus 55 EFM frames after the last data block. As a consequence, the additional length enabling the interleaving to be recorded is formed by two blocks plus 98 EFM frames, namely three redundant blocks. Thus, by accurately choosing the link position in relation to the sub-coding synchronization information as well as the coding of the blocks, it is possible to restrict the number of redundant blocks.

Furthermore, the recognition of the different types of blocks is obtained by using the word concerning the mode in the preamble of the blocks. This word includes 8 bits which are then distributed as follows:

the bits 7 and 6 give an indication on the type of block namely, for example:

0 = 00: blocks of user data;
1 = 0 1: run-in block;
2 = 1 0: run-out block;
3 = 1 1: dummy block these bits 3 and 2 are reserved bits while the bits 1 and 0 concern the mode used for the block format according to the modes used in the ROM-CD standard.

What is claimed is:

1. A method for linking and recording data on an optical disk having synchronization information pre-recorded on the disc comprising the following steps:
   formatting pieces of data in frames,
   formatting p frames in blocks and
   formatting n blocks in groups,
   encoding said pieces of data with a CIRC type error correction code,
   adding during the encoding five redundant blocks to each group with each group of n blocks being preceded by three of said five redundant blocks, said three redundant blocks being a run-in preceded by a first dummy block and a second dummy block, and each group of n blocks being followed by two remaining of said five redundant blocks, said two redundant blocks being a run-out block followed by a dummy block,
   and recording on the disk only said encoded pieces of data and said three dummy blocks, whereby after recording and when said optical disc is read the reading of said groups are separated from one another by use of said dummy blocks.

2. A method according to claim 1, wherein each block is provided with and includes data on synchronization, a preamble including block information and mode information and a data field.

3. A method according to claim 2, wherein the mode information are encoded in an eight-bit word with two bits indicating the type of block.

4. A method according to claim 1, further comprising the recording on the disk being initialized by a link position determined by information on sub-coding synchronization, said sub-coding synchronization being synchronized with a pre-recorded synchronization information on the disc.

5. A method according to claim 4, wherein said link position is within plus or minus two frames.

6. A method according to claim 4, wherein said link position is computed at a position ranging from 11 to 98 frames, and is encoded after the sub-coding synchronization information.

7. A method according to claim 6, wherein said link position is at 55 frames from the synchronization information on the disc.

8. A method according to claim 9, wherein the recording period starts in a frame corresponding to the second dummy block, and stops in a frame corresponding to the third dummy block.

9. A method according to claim 1, where said method employs linear interleaving of data in said recording.

10. A method according to claim 1, where the number of frames in a block is at least 98.

* * * * *